March 18, 1969     W. C. KAMPF     3,433,496
CART CONSTRUCTION
Filed Dec. 30, 1966
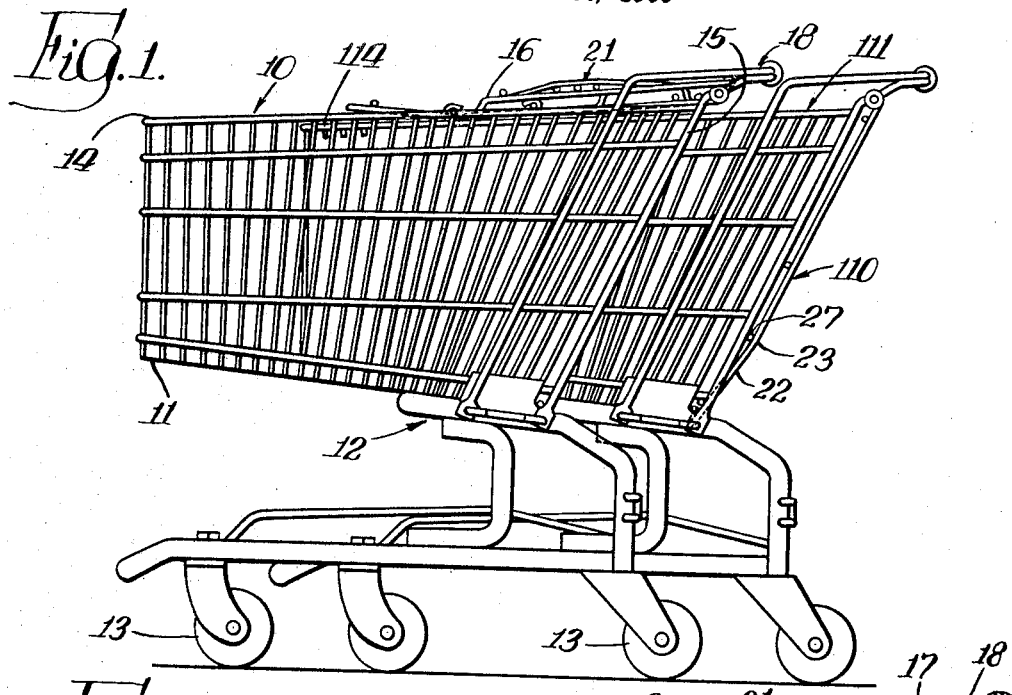
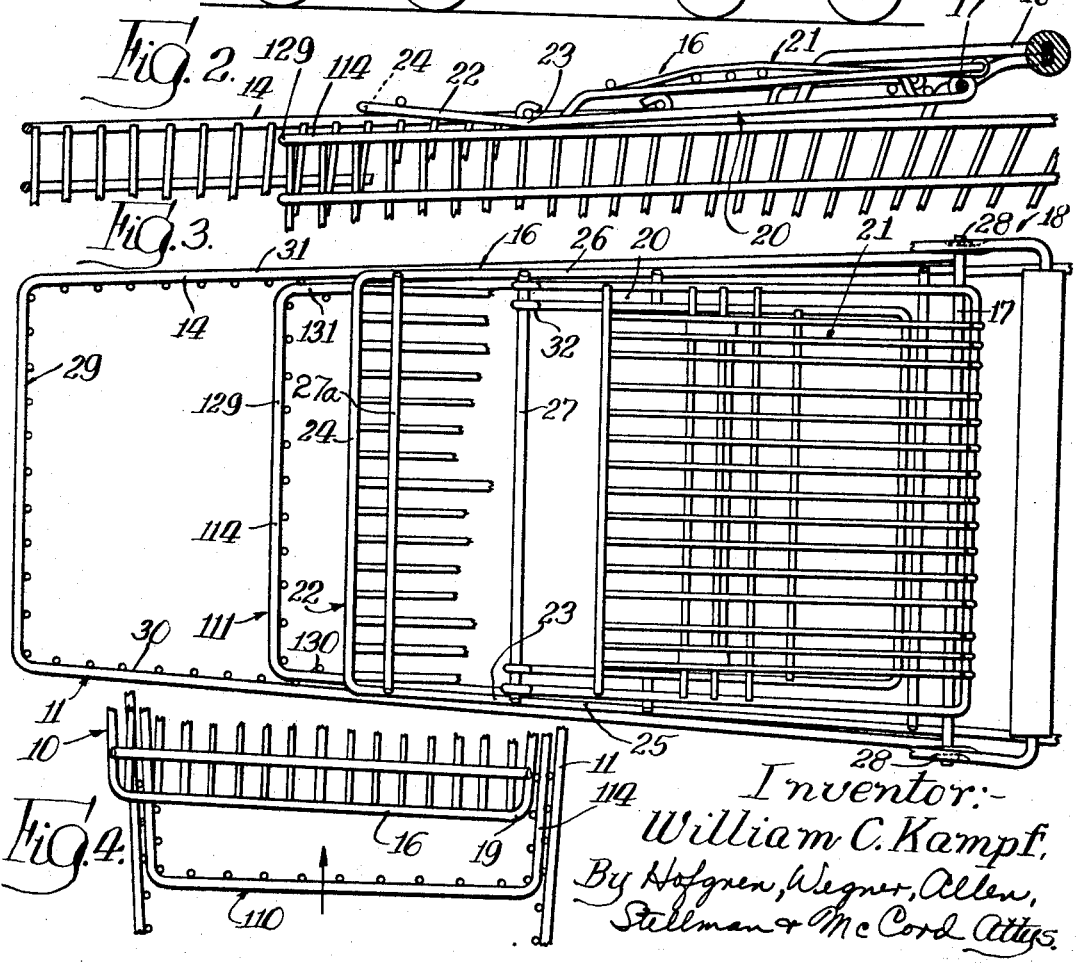
Inventor:-
William C. Kampf,
By Hofgren, Wegner, Allen,
Stellman & McCord Attys.

United States Patent Office 3,433,496
Patented Mar. 18, 1969

3,433,496
CART CONSTRUCTION
William C. Kampf, Jackson, Mich., assignor to
Tote-Cart Company, a corporation of Illinois
Filed Dec. 30, 1966, Ser. No. 606,390
U.S. Cl. 280—33.99                                8 Claims
Int. Cl. B62b 5/00, 11/00

ABSTRACT OF THE DISCLOSURE

An improved gate construction for use in a shopping cart wherein an offset end portion of the gate is provided to prevent accidentally locking a second such cart telescoped into the cart by inadvertent dropping of one corner of the gate into the basket of the telescoped cart.

---

This invention relates to shopping carts and in particular to gate structures for use in such shopping carts.

In one form of conventional shopping cart, a wire basket is mounted on a suitable base provided with casters. The rear of the basket is closed by a gate which is pivotally mounted on the basket to swing from a downwardly hanging basket-closing position, to a forwardly extended position as an incident of the telescoping of the basket of a second such cart through the rear of the basket of the first cart against the swinging gate. Heretofore, a problem has arisen in such cart constructions in that the second, telescoped cart may become inadvertently locked in association with the first cart by a dropping of the gate slightly into the telescoped cart basket so as to bring one corner of the gate to below the top level of the telescoped cart basket. This presents a highly annoying problem to the user and often results in damage to the carts by the attempted forceful separation of the carts against the interlocked retention. The present invention comprehends a new and improved gate construction which effectively precludes such interlocking of the telescoped carts, thereby effectively providing substantially foolproof separability and minimizing maintenance requirements.

Thus, a principal feature of the present invention is the provision of a new and improved cart construction.

Another feature of the invention is the provision of such a cart construction having new and improved gate structure effectively precluding the interlocking of such carts when telescoped.

A further feature of the invention is the provision of such a cart construction wherein the gate structure is provided with an angular offset end portion effectively precluding the interlocking of the gate end with a telescoped second cart basket.

Another feature of the invention is the provision of a shopping cart having a basket provided with a U-shaped top portion including a transverse front member and longitudinal side member, structure comprising, a wire gate having a substantially flat panel portion, a substantially flat end portion, means connecting the end portion to one end of the panel portion, and means for mounting the gate at the rear of the basket for swinging movement thereof in the basket from a depending position with the end portion lowermost for closing the rear of the basket to a forwardly swinging position with the end portion forwardmost as an incident of the telescoping of the basket of a second such shopping cart into the basket, the connecting portion being arranged to cause the end portion of the gate to extend angularly to the flatwise extent of the panel portion to terminate above the top portion of a second such cart telescoped into the basket with the gate resting at the connecting portion on the top portion of the second cart.

Other features and advantages of the invention will be apparent from the following description taken in connection with the accompanying drawings wherein:

FIGURE 1 is a side elevation of a pair of shopping carts provided with gate structures embodying the invention, the shopping carts being shown in telescoped association;

FIGURE 2 is a fragmentary enlarged side elevation thereof, with portions broken away to facilitate illustrating of the invention;

FIGURE 3 is a top plan view thereof; and

FIGURE 4 is a fragmentary top plan view illustrating an arrangement of the gate structure which heretofore has has caused undesirable interlocking of the telescoped carts.

In the exemplary embodiment of the invention as disclosed in the drawing, a shopping cart generally designated 10 includes a wire basket 11 carried on a base 12 provided with a plurality of casters 13 for wheeled movement of the cart. The basket includes a top wire portion 14 and an open rear portion 15. A gate 16 is swingably mounted on a pivot 17 associated with a rear handle 18 on the basket for selective positioning in a generally upright position closing the rear opening 15 of the basket and a forwardly extended position slightly above the top portion 14 of the basket. The gate is swung to the forward position as the result of a telescopic insertion of a second such cart generally designated 110 into the cart 10, as shown in FIGURE 1. Thus, the basket 111 of the second cart engages the gate 16 as the basket is moved through the open rear portion 15 of the cart 10 to swing it from the depending position to the forwardly extending position thereby to permit the basket 111 to be inserted to the preselected depth into the basket 11.

The present invention comprehends an improved gate structure which effectively avoids the heretofore serious problem of locked association of such telescoped carts as a result of a catching of the swung gate with the basket of the inserted cart. Thus, for example, as shown in FIGURE 4, the gate may in certain carts be skewed somewhat to the fore and aft direction of the basket 11 so as to have a corner such as front corner 19 thereof be within the area defined by the top wire portion 114 of the inserted cart. In the conventional gate construction, corner 19 may be disposed at or below the level of the top portion 14 so that a movement of the cart 110 relative to the cart 10 in a releasing direction as indicated by the arrow in FIGURE 4 would cause the corner 19 to engage the top portion 114 and lock the cart 110 against withdrawal from the cart 10.

More specifically, as best seen in FIGURES 2 and 3, the gate 16 includes a generally planar panel portion 20 carrying baby seat 21. The gate further is defined by a generally planar end portion 22 joined to the panel portion 20 by a connected portion 23 which disposes the end portion 22 at a small angle to the flat plane of the panel portion, herein at an angle of approximately 8°. The gate includes a transverse end wire 24, a transverse reinforcing wire 27a, a left side wire 25, a right side wire 26, and a transverse reinforcing wire 27 extending between side wires 25 and 26 at connecting portion 23. Herein the pivot 17 comprises a rod secured to the gate panel 20 and pivotally received in suitable openings 28 in the handle structure 18. The top wire portion 14 of the basket 11 is generally U-shaped at the front end 29, and as best seen in FIGURE 3, the width of the end 22 of the gate is slightly greater than the width of the front end 14 of the basket so that when the basket 111 of the second cart is moved into the basket 11 the end 22 of the gate overlies the side wires 130 and 131 of the basket top 114. As shown in FIGURE 2 the gate 16 rests on the top portion 114 at the connection portion 23 in the telescoped association of the baskets. By virtue of the offset or angled relationship of the end portion 22 to the panel portion 20 of the gate 16, the end wire 24 is disposed substantially above the level of the front end 129 of the inserted basket thereby effectively posititively precluding interlocking of the gate 16 with the inserted basket 111.

The end portion 22 herein has a length approximately one-third of that of the panel portion. Thus, the spacing of the front wire 24 above the plane of the top 114 of the inserted basket is substantial notwithstanding the provision of the offset at a relatively small angle. The displacement of the front wire 24 from the plane of the flatwise extent of the panel portion 20 may be approximately one inch and, in the illustrated embodiment, is approximately ⅞ inch. The invention comprehends the extension of the end portion 22 at a suitable angle to displace the front wire 24 sufficiently to preclude the undesirable interlocking discussed above. Thus, for example, where the end portion 22 is of shorter length, the desired offset of the wire 24 may be effected by utilizing a correspondingly greater angle.

As best seen in FIGURES 2 and 3, the baby seat 21 is pivotally connected to the transverse reinforcing wire 27 by suitable loop connections 32.

I claim:

1. In a shopping cart having a basket provided with a U-shaped top portion including a transverse front member and longitudinal side members, structure comprising: a wire gate having a substantially flat panel portion, a substantially flat end portion having a transverse extent substantially similar to that of said panel portion, means connecting said end portion to one end of said panel portion, an end wire extending transversely across the distal end of said gate end portion, and means for mounting the gate at the rear of said basket for swinging movement thereof in the basket from a depending position with said end portion lowermost for closing the rear of the basket to a forwardly swung position with said end portion forwardmost as an incident of the telescoping of the basket of a second such shopping cart into said basket, said connecting portion being arranged to cause said end portion of the gate to extend angularly to the flatwise extent of said panel portion to dispose said end wire substantially above the top portion of a second such cart telescoped into said basket with said gate resting at said connecting portion on said top portion of the second cart.

2. The shopping cart of claim 1 wherein said connecting portion disposes said end portion at an angle of approximately 8° to the flatwise extent tof the panel portion.

3. The shopping cart of claim 1 wherein said end portion has a length approximately one-third that of said panel portion.

4. The shopping cart of claim 1 wherein said gate is provided with a first transverse reinforcing wire at said connection portion and at least one additional transverse reinforcing wire intermediate said first reinforcing wire and said end wire for rigidifying said flat gate end portions.

5. The shopping cart of claim 1 wherein said end wire defining the distal end of said end portion is displaced from the plane of the flatwise extent of said panel portion approximately one inch.

6. The shopping cart of claim 1 wherein said cart structure includes a transverse reinforcing wire at said connecting portion, and a baby seat movably secured to said reinforcing wire.

7. The shopping cart of claim 6 wherein the baby seat includes a plurality of wires having ends looped about said reinforcing wire for pivotally mounting the baby seat on the gate.

8. The shopping cart of claim 1 wherein said gate includes a pair of side wires defining the lateral boundary of said gate and rounded corner portions defining a unitary connection of said side wires to said end wire.

References Cited

UNITED STATES PATENTS

| | | |
|---|---|---|
| 2,583,513 | 1/1952 | Maslow. |
| 2,998,978 | 9/1961 | Sides. |
| 3,023,018 | 2/1962 | Welter. |

LEO FRIAGLIA, *Primary Examiner.*

M. L. SMITH, *Assistant Examiner.*